(12) United States Patent
Araujo

(10) Patent No.: US 11,167,162 B2
(45) Date of Patent: Nov. 9, 2021

(54) METHOD FOR PREPARING CHEMICAL DIGESTER AND ITS USE FOR THE TREATMENT OF ORGANIC MATTER

(71) Applicant: CINCO H, S.A. DE C.V., San Salvador (SV)

(72) Inventor: Andres Mauricio Houdelot Araujo, San Salvador (SV)

(73) Assignee: CINCO H, S.A. DE C.V., San Salvador (SV)

( * ) Notice: Subject to any disclaimer, the term of this patent is extended or adjusted under 35 U.S.C. 154(b) by 449 days.

(21) Appl. No.: 16/226,337

(22) Filed: Dec. 19, 2018

(65) Prior Publication Data

US 2019/0201727 A1 Jul. 4, 2019

Related U.S. Application Data

(63) Continuation-in-part of application No. 16/168,716, filed on Oct. 23, 2018, now abandoned.

(30) Foreign Application Priority Data

Oct. 25, 2017 (SV) .............................. 20170022516

(51) Int. Cl.
| | |
|---|---|
| *A62D 3/36* | (2007.01) |
| *C02F 11/00* | (2006.01) |
| *A01C 3/02* | (2006.01) |
| *C02F 11/147* | (2019.01) |
| *C05G 3/90* | (2020.01) |
| *A62D 101/45* | (2007.01) |
| *A62D 101/24* | (2007.01) |
| *A62D 101/26* | (2007.01) |
| *A62D 101/04* | (2007.01) |
| *C02F 1/66* | (2006.01) |

(52) U.S. Cl.
CPC ................ *A62D 3/36* (2013.01); *A01C 3/023* (2013.01); *C02F 11/004* (2013.01); *C02F 11/147* (2019.01); *C05G 3/90* (2020.02); *A62D 2101/04* (2013.01); *A62D 2101/24* (2013.01); *A62D 2101/26* (2013.01); *A62D 2101/45* (2013.01); *C02F 1/66* (2013.01); *C02F 2303/02* (2013.01); *C02F 2303/04* (2013.01); *C02F 2303/06* (2013.01); *C02F 2303/12* (2013.01)

(58) Field of Classification Search
CPC .... A62D 3/36; A62D 2101/04; A62D 201/24; A62D 2101/26; A62D 2101/45; A01C 3/023; C02F 11/004; C02F 2303/02; C02F 2303/06; C05G 3/90
USPC ......................................................... 588/318
See application file for complete search history.

(56) References Cited

U.S. PATENT DOCUMENTS 5,773,283 A * 6/1998 Pierce ...................... A62D 3/02
435/262

* cited by examiner

*Primary Examiner* — Edward M Johnson
(74) *Attorney, Agent, or Firm* — Lewis Roca Rothgerber Christie LLP

(57) ABSTRACT

This invention refers to a method for preparing a chemical digester characterized by using organic and inorganic elements used for multiple purposes such as an accelerator in the decomposition of organic matter, as a water flocculant, as an organic soil fertilizer and as a means to eliminate the concentration of flies and other inserts in organic matter to decompose. The method comprises heating water in a reactor at a temperature of 38° C., adding a polysaccharide, an anti-thickener and an antifoam. The method then comprises the addition of two organic acids, one of them previously mixed in a second reactor and, finally, an inorganic acid until the mixture is homogenized. Optionally the method comprises the packaging of the mixture and the treatment of organic matter.

34 Claims, 1 Drawing Sheet

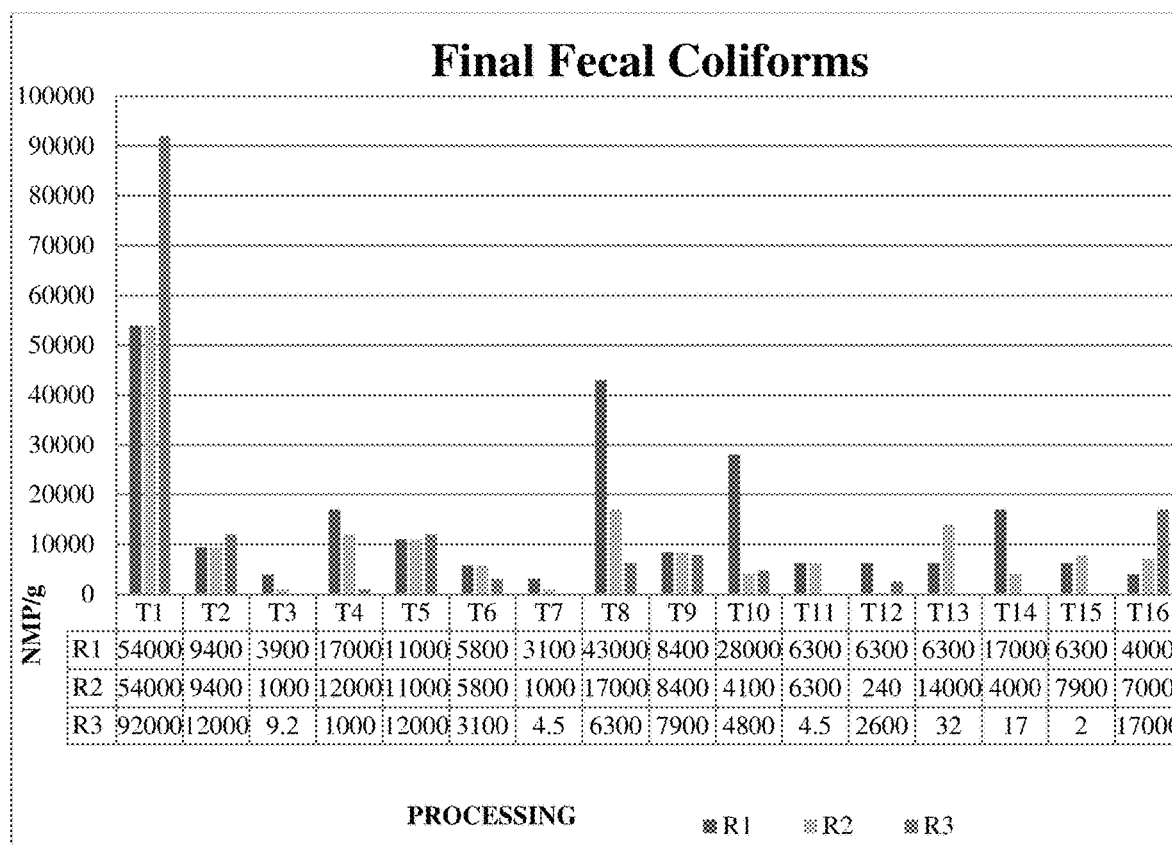

METHOD FOR PREPARING CHEMICAL DIGESTER AND ITS USE FOR THE TREATMENT OF ORGANIC MATTER

CROSS-REFERENCE TO RELATED APPLICATION

This application is a continuation-in-part of U.S. application Ser. No. 16/168,716, filed on Oct. 23, 2018, which claims priority to and the benefit of El Salvador Patent Application No. 20170022516, filed in El Salvador on Oct. 25, 2017, the entire contents of which are incorporated herein by reference.

FIELD OF THE INVENTION

This invention refers to a method for the preparation of a chemical digester and its use for water treatment, soil fertilization, elimination of pollutants and acceleration of agricultural, livestock and agro-industrial waste decomposition, among other applications.

This invention has action over a wide spectrum of situations and technical problems that are mentioned below. They are represented by: a) wastewater treatment; b) soil fertilization; c) elimination of pollutants, and d) acceleration of agricultural, livestock and agro-industrial waste decomposition. Likewise, pollutants derived from the latter are eliminated, such as the increase of insects (flies, cockroaches), rodents and animals that could spread those pollutants in the human population.

STATE OF THE ART AND PREVIOUS ART

Wastewater comes from homes (laundry, sinks, and toilets), industries, livestock factories and processing plants of all kinds of products and has the characteristic of being dirty and on several occasions highly contaminated. Wastewater usually contains a wide variety of pollutants that must be removed before discharging wastewater on public roads or being returned to nature (rivers, lakes). Such pollutants include: organic matter, such as proteins, carbohydrates and lipids; chemical products, namely pesticides, insecticides, heavy metals and fertilizers.

A series of processes and mechanisms have been developed that aim to eliminate specific pollutants, for example: phenol oxidases and hydrogen peroxide have been used to discolor pulp and wastewater from paper mills (U.S. Pat. No. 5,407,577); Enzymes of an atypical strain of *Bacillus stearothermophilus* have been used to degrade the cell walls of algae (U.S. Pat. No. 5,139,945); a combination of bacteria and enzymes has been used to improve the water quality of standing bodies of water (U.S. Pat. No. 5,227,067); cellulases have been used to digest wood/paper compositions (U.S. Pat. No. 5,326,477); *Xanthomonas maltophilia* and *Bacillus thuringiensis* have been used to degrade polar organic solvents (U.S. Pat. No. 5,369,031); yeasts have been used to digest wastewater containing carbohydrates (U.S. Pat. No. 5,075,008); a combination of β-glucanase, (α-amylase and proteases) has been used to digest microbial silt (U.S. Pat. No. 5,071,765); and a combination of amylase, lipase and/or proteases has been used to digest colloidal material such as starch, fat, oil and protein. However, each of these compositions is directed only to a specific pollutant and does not address the variety of pollutants generally found in wastewater. Other attempts (U.S. Pat. No. 3,635,797) have used a yeast fermentation composition to deodorize wastewater ponds and degrade organic waste. However, it has been found that this composition is unstable and produced variable results from one batch to another. For this reason, it is necessary to have a composition and a method for the decontamination and digestion of a wide variety of pollutants that are typically found in wastewater.

Likewise, it is necessary to have a natural flocculant for water treatment allowing easily eliminate the supernatants, decreasing the generation of bad odors and sedimenting more quickly the solids with a clarifying effect thereof.

Another technical field that invention seeks to improve is the way to increase production and growth of crops or pastures in soils from the application of nutritive fertilizers to soils. Soil nutrients such as nitrogen, potassium, phosphorus and sulfur as well as trace elements such as iron, copper and magnesium are useful to achieve more prosperous crop growth. However, after repeated cycles of plantations, the amount of the mentioned nutrients in the soil decreases producing scarce growth and yield of the plantations in that soils. In order to counteract nutrient deficiency in soils, the application of fertilizers is highly desirable.

As demonstrated by the U.S. Pat. No. 7,811,352 B2 fertilizers can be classified as organic fertilizers or inorganic fertilizers. The first are all those that contain a molecular skeleton including a central carbon such as compositions derived from living matter such as manure, compost, bone meal, compounds with feathers and with blood. On the contrary, inorganic fertilizers come from inert materials such as: ammonium nitrate, ammonium sulfate, urea, calcium, potassium, ammonium phosphate, anhydrous ammonia, and other salts such as phosphorus.

Inorganic fertilizers are commercially available and contain soluble nutrients that are immediately available to the plant. These fertilizers are usually at low cost. Another advantage is that the amount of fertilizer for an application can be accurately calculated. However, several disadvantages are those presented by inorganic fertilizers. For example, fertilizers enriched in nitrogenous compounds, have to produce leaching or undesirable filtration at the time of its application either by irrigation or by the rains cause the fertilizer to exceed the desired place for the nutrition of the plants filtering in the layers. On the one hand, this produces an economic loss because the fertilizer will not fulfill its duty to nourish the plants and, on the other hand, it can produce groundwater contamination. Secondly, the excessive application of inorganic fertilizers can cause phytotoxicity causing damage to tissues and roots of plants, especially in young plants.

Third, the repeated application of inorganic fertilizers can elevate the concentration of salts in soils, producing toxicity in the soil and rendering them infertile. On the other hand, organic fertilizers are not immediately available for plants and require the presence and action of soil microorganisms to break down those components of fertilizers and transform them into simpler structures before use by plants. Although organic fertilizers do not reflect the toxicity or the danger of the accumulation of salts in them, rather they act as stimulators of soil microorganisms, many organic fertilizers have the disadvantages that they require much time to produce effects in plants and they are expensive.

Various fertilizers have been proposed, among them, US 2017/0020132 A1; U.S. Pat. No. 7,160,350 B2; WO2011080496; U.S. Pat. No. 7,811,353 B2 and U.S. Pat. No. 8,221,515 B2. Although these patents incorporate the use of phosphorus and/or nitrogen to enrich soils through a mechanism that also involves facilitating the absorption of said nutrients, the mentioned risks for inorganic fertilizers are present in the aforementioned patents and applications.

For this reason, it is desirable to find a fertilizer that has the benefits of organic and inorganic fertilizers but at the same time it should be quick, economical and does not produce toxicity in the soil.

On the other hand, another technical field in which this invention is involved is the ability to find a composition and a preparation method that serves as a chemical accelerator in the decomposition of organic matter. In the market there are enzymatic digesters that use plant extracts that contain efficient microorganisms (aerobic and anaerobic bacteria and fungi) such as INDIGO™ of Agri-Dow Marketing Inc. USA or others that use mixtures of organic catalysts (enzymes) with microorganisms efficient together with a combination of vitamins, humic acids such as Stubble Digester (Cytozume USA) and the Advanced Stubble (Advanced Nutrients—Australia). However, all these digesters have the particularity of incorporating ingredients that seek to accelerate natural processes of decomposition that generates an imbalance in the natural process of decomposition of organic matter.

The mechanism of decomposition of the mentioned enzymatic digesters is to catalyze the decomposing matter by increasing the temperature above 60° C., thereby destroying the microorganisms while slowing the natural decomposition process. On the other hand, these digesters contain microorganisms that are added to the matter to decompose but that come from exogenous and remote zones and environments which are often inefficient to decompose the concerned organic matter. That is, they are biologically treated with xenobiotic microorganisms. Consequently, it is necessary to have a digester of organic matter that does not contain enzymes or efficient foreign microorganisms and that its mechanism is of universal application by activating in a natural way the microorganisms that are found spontaneously in the matter to decompose. Also, it is necessary to have a digester of organic matter that does not increase the temperature above 38° C., by promoting and leaving alive microorganisms typical of the matter to decompose.

SUMMARY OF THE INVENTION

This invention comprises a method for preparing a chemical digester that is characterized by using organic and inorganic elements that will have multiple purposes such as for an accelerator in the decomposition of organic matter, as a water flocculant, as an organic soil fertilizer and as an organic fertilizer as a means to eliminate the concentration of flies and other insects in the organic matter to be decomposed.

Another effect of the use of this invention is to be a blocker of the expansion of NH3 among other examples of toxic gases to be fought.

Especially the chemical digester presented in this invention performs a combination of inorganic and organic elements by a method that uses heat, however, the temperature applied to the method is characterized by not exceeding 38° C., thus allowing the mixture to decompose to conserve those essential microorganisms without these being eliminated by action of the heat.

The chemical digester preparation is carried out in a reactor, preferably an agitator with a capacity of 220 liters to produce a batch of 200 kg. It can be made of steel, preferably made of stainless steel, more preferably made of HDPE plastic or in its Spanish acronym HDPE (High Density Polyethylene). The reactor has a type of mechanical agitation, the geometry of the blades are of jagged disk being the disk size of at least a minimum of 30% of the diameter of the tank, and the reactor has an engine power of 1 hp per 100 litres of finished product (1000 rpm max).

Specifically, the method for making the chemical digester presented in this patent comprises the following steps: 1) heating of the formulation medium; 2) addition and dispersion of a thickener; 3) adding and dispersion of a polysaccharide followed by the addition of an antifoam; 4) removal from heat and adding the formulation medium; 5) premix of a first organic acid with formulation medium and added to the main reactor; 6) adding a second organic acid in the main reactor; 7) adding an inorganic acid to the main reactor and 8) dispersing until the mixture is homogenized. Once the mixture is duly homogenized an optional step (9) of the invention is the packaging for its proper preservation.

BRIEF DESCRIPTION OF THE DRAWINGS

Illustrative, non-limiting example embodiments will be more clearly understood from the following detailed description taken in conjunction with the accompanying drawing.

FIG. 1 is a graph of comparisons of results of three sludge treatments according to embodiments of the present invention.

DETAIL OF THE INVENTION

The first step in the elaboration of the chemical digester consists of the addition of a formulation mean, preferably water (H2O) of maximum allowed hardness TDS 200 ppm, range of pH 6-8 free of pathogens (hereinafter "water"), to a main reactor equal 45%-50% of the capacity of the reactor, preferably 48% of the capacity thereof. In a final 200 kg preparation of chemical digester, 87.8 liters of water will be added to the reactor. Once the volume of water mentioned has been poured, it is heated by means of electric resistances until a constant temperature of 36° C. to 38° C., preferably not exceeding of 38° C., is reached.

The second step of the elaboration of the chemical digester comprises the addition of thickeners and polysaccharides and their dispersion. In this sense, 0.33% (m/m) of the thickener, preferably xanthan gum (Jungbunzlauer) (food grade E415 USP NF FCC), is added directly to the main reactor under agitation, preferably 700 rpm and then added 2%-2.3% (w/w) preferably 2.195% (w/w) of a polysaccharide, preferably sucrose until the homogenization of the resulting mixture is complete. The mixture is stirred for 30 minutes.

Next add 0.22%-0.24% (w/w), preferably 0.225% (m/m) of an antifoam, is added, preferably Polysiloxate Wacker (Food-grade) and continue stirring the mixture at medium speed, preferably 350 rpm-550 rpm, for 10 minutes. Subsequently, the constant heating referred to in the first step is stopped and the rest of the substitution process proceeds at room temperature. In a final 200 kg preparation of chemical digester, the second step will be added: i) 0.66 kg of xanthan gum (Jungbunzlauer) (food grade E415 USP NF FCC); ii) 4.39 kg of sucrose and iii) 0.45 kg of Wacker Polysiloxane antifoam (Food-Grade).

The third step of the invention comprises the preparation of a premix and wetting of a first organic acid with the formulation mean. The premix is made in a secondary reactor, preferably 20 liters capacity for a final 200 kg preparation of chemical digester. The premix comprises firstly the mixture of an organic acid, preferably citric acid (Food-Grade), with water in a ratio of 1:2 (citric acid and water respectively).

To facilitate the mixture, it is stirred for 10 minutes and/or until the complete transparency of the mixture is obtained. Subsequently, the resulting premix is poured into the main reactor at a constant speed, preferably 15 liters/minute. In a final 200 kg preparation of chemical digester, preferably 3.39 kg of citric acid (Food-Grade) with preferably 8.81 kg of water at room temperature will be added preferably in the third step in a secondary reactor with capacity for 20 liters.

Once the premix mentioned in the third step has been poured in the main reactor, 0.84% (w/w) of a second organic acid, preferably acetic acid (Food-Grade). In a final 200 kg preparation of chemical digester will be added in this fourth step the amount of 1.32 kg of acetic acid (Food-Grade).

As a fifth step, 3.75% (w/w) of an inorganic acid, preferably 85% pure (Food-Grade) phosphoric acid ($P_2O_5$) under stirring, will be added to the main reactor preparation until the total dissolution. After the final homogenization, the mixture is kept stirred for 10 minutes. In a preferred preparation of 200 kg final chemical digester the present invention is added in the fifth step 6.15 kg phosphoric acid ($P_2O_5$) 85% purity (food-grade).

Finally and as a sixth step, the resulting mixture is homogenized for 30 minutes at room temperature and at a constant stirring speed.

Optionally, quality controls of the resulting mixture comprising quality, pH, density and total solids are carried out and the liquid product obtained is packaged in suitable containers, preferably HPDE or PET and/or other suitable for storing acidic substances, together with induction seal and airtight plug.

In an alternative embodiment, the heating indicated in the first step can be dispensed with as long as the time intended for homogenization with the polysaccharide and the thickener indicated in the second step will last at least 20 minutes.

Once the mixture resulting from the described method has been obtained, it can be applied for water treatment, soil fertilization, elimination of pollutants and acceleration of the decomposition of agricultural, livestock and agroindustrial residues, making dilutions that an expert in the field can understand.

EXAMPLES

Example No. 1: Application of Chemical Digester to Decrease Fecal Coliform Populations in Ordinary Sludge from the Wastewater Treatment Plant ("PTAR") of San Juan De Talpa, La Paz, El Salvador The work consisted in comparing the fecal coliform reduction in the PTAR mentioned according to the Official Mexican Standard NOM-004-SEMARNAT-2002. A sample of sludge from the WWTP contains, according to a study (Aviles Sacoto 2015), the following elements:

| | |
|---|---|
| Organic Matter: | 40%-80% |
| Nitrogen: | 2.5% St |
| Phosphorus $P_2O_5$ | 1.6% St |
| Potassium $K_2O$: | 0.4% St |

Likewise, the pathogens frequently found in the sludges are fecal coliforms, *Salmonella* spp, helminth eggs, *E. Coli; Enterobacter; Klebsiella* and citrobacter among others. The treatment of these sludge in PTAR is highly recommended.

It is known in the literature that stubble digesters release carbohydrate energy by accelerating bacterial growth, thus reducing nitrogen needs for waste digestion (Aguillón Martinez et al 1993). Also, for the present example, peroxyacetic acid ($C_2H_4O_3$) was applied separately and independently, which functions as an effective disinfectant consisting of a quaternary equilibrium solution (acetic acid, peracetic acid, hydrogen peroxide and water) functioning in a similar to that of chlorogens, that is, with a broad oxidizing power. In the example, peroxyacetic acid was used (BioSide™ HS 15%).

Three sludge treatments were carried out with independent application of the digester of the present invention and of peroxyacetic acid (BioSide™ HS 15%) and in a combined manner, in different concentrations, namely: i) for the chemical digester of this invention in concentrations: 0 cc/t; 100 cc/t; 150 cc/t and 200 cc/t. For peroxyacetic acid (BioSide™ HS 15%) in concentrations: 0 cc/t; 250 cc/t; 350 cc/t and 450 cc/t. Initial samples were taken and then placed in 48 rectangular boxes of 6 kg/box, of dimensions: width 40 cm, length 60 cm and depth 10 cm. Finally the samples in the boxes were irrigated with water and then placed in them a dose of the substances (digester of the present invention and/or peroxyacetic acid BioSide™ HS 15%) to treat the samples.

TABLE A

| | A | | B | |
|---|---|---|---|---|
| Treatment | Chemical Digestor | Peroxyacetic Acid | Chemical Digestor | Peroxyacetic Acid |
| T1 | — | — | — | — |
| T2 | 100 | — | 0.6 cc | — |
| T3 | 150 | — | 0.9 cc | — |
| T4 | 200 | — | 1.2 cc | — |
| T5 | — | 250 cc | — | 1.5 cc |
| T6 | — | 350 cc | — | 2.1 cc |
| T7 | — | 450 cc | — | 2.7 cc |
| T8 | 100 | 250 cc | 0.6 cc | 1.5 cc |
| T9 | 150 cc | 250 cc | 0.9 cc | 1.5 cc |
| T10 | 200 cc | 250 cc | 1.2 cc | 1.5 cc |
| T11 | 100 cc | 350 cc | 0.6 cc | 2.1 cc |
| T12 | 150 cc | 350 cc | 0.9 cc | 2.1 cc |
| T13 | 200 cc | 350 cc | 1.2 cc | 2.1 cc |
| T14 | 100 cc | 450 cc | 0.6 cc | 2.7 cc |
| T15 | 150 cc | 450 cc | 0.9 cc | 2.7 cc |
| T16 | 200 cc | 450 cc | 1.2 cc | 2.7 cc |

TABLE B

| Class | Bacteriological Indicator of Pollution Fecal coliforms NM/g |
|---|---|
| A | Less than 1,000 |
| B | Less than 1,000 |
| C | Less than 2,000,000 |

TABLE C

| Exploitation of Biosolids | | |
|---|---|---|
| Kind | Class | Exploitation |
| Excellent | A | Urban uses with direct public contact during your application Those established for class B and C |

TABLE C-continued

Exploitation of Biosolids

| Kind | Class | Exploitation |
|---|---|---|
| Excellent or Good | B | Urban uses with direct public contact during your application |
| | | Those established for class C |
| Excellent or Good | C | Forest uses |
| | | Improvement of soils |
| | | Agricultural uses |

TABLE D

| | Repetition 1 | | |
|---|---|---|---|
| Treatment | NMP/g on dry basis | Category | Class |
| T1 = Witness | 54,000 | >1000 | C |
| T2 = 100 cc/t D | 9,400 | >1000 | C |
| T3 = 150 cc/t D | 3,900 | >1000 | C |
| T4 = 200 cc/t D | 17,000 | >1000 | C |
| T5 = 250 cc/t D | 11,000 | >1000 | C |
| T6 = 350 cc/t A | 5,800 | >1000 | C |
| T7 = 450 cc/t A | 3,100 | >1000 | C |
| T8 = 250 cc/t A + 100 cc/t D | 43,000 | >1000 | C |
| T9 = 250 cc/t A + 150 cc/t D | 8,400 | >1000 | C |
| T10 = 250 cc/t A + 200 cc/t D | 28,000 | >1000 | C |
| T11 = 350 cc/t A + 100 cc/t D | 6,300 | >1000 | C |
| T12 = 350 cc/t A + 150 cc/t D | 6,300 | >1000 | C |
| T13 = 350 cc/t A + 200 cc/t D | 6,300 | >1000 | C |
| T14 = 450 cc/t A + 100 cc/t D | 17,000 | >1000 | C |
| T15 = 450 cc/t A + 150 cc/t D | 6,300 | >1000 | C |
| T16 = 450 cc/t A + 200 cc/t D | 4,000 | >1000 | C |

TABLE E

| | Repetition 2 | | |
|---|---|---|---|
| Treatment | NMP/g on dry basis | Category | Class |
| T1 = Witness | 54,000 | >1000 | C |
| T2 = 100 cc/t D | 9,400 | >1000 | C |
| T3 = 150 cc/t D | 1,000 | >1000 | A |
| T4 = 200 cc/t D | 12,000 | >1000 | C |
| T5 = 250 cc/t A | 11,000 | >1000 | C |
| T6 = 350 cc/t A | 5,800 | >1000 | C |
| T7 = 450 cc/t A | 1,000 | >1000 | A |
| T8 = 250 cc/t A + 100 cc/t D | 17,000 | >1000 | C |
| T9 = 250 cc/t A + 150 cc/t D | 8,400 | >1000 | C |
| T10 = 250 cc/t A + 200 cc/t D | 4,100 | >1000 | C |
| T11 = 350 cc/t A + 100 cc/t D | 6,300 | >1000 | C |
| T12 = 350 cc/t A + 150 cc/t D | 240 | >1000 | C |
| T13 = 350 cc/t A + 200 cc/t D | 14,000 | >1000 | C |
| T14 = 450 cc/t A + 100 cc/t D | 17,000 | >1000 | C |
| T15 = 450 cc/t A + 150 cc/t D | 6,300 | >1000 | C |
| T16 = 450 cc/t A + 200 cc/t D | 4,000 | >1000 | C |

TABLE F

| | Repetition 3 | | |
|---|---|---|---|
| Treatment | NMP/g on dry basis | Category | Class |
| T1 = Witness | 92,000 | >1000 | C |
| T2 = 100 cc/t D | 12,000 | >1000 | C |
| T3 = 150 cc/t D | 9.2 | <1000 | A |
| T4 = 200 cc/t D | 1,000 | <1000 | A |
| T5 = 250 cc/t A | 12,000 | >1000 | C |
| T6 = 350 cc/t A | 3,100 | >1000 | C |
| T7 = 450 cc/t A | 4.5 | <1000 | A |
| T8 = 250 cc/t A + 100 cc/t D | 6,300 | >1000 | C |
| T9 = 250 cc/t A + 150 cc/t D | 7,900 | >1000 | C |
| T10 = 250 cc/t A + 200 cc/t D | 4,800 | >1000 | C |
| T11 = 350 cc/t A + 100 cc/t D | 4.5 | <1000 | A |
| T12 = 350 cc/t A + 150 cc/t D | 2,600 | >1000 | C |
| T13 = 350 cc/t A + 200 cc/t D | 32 | <1000 | A |
| T14 = 450 cc/t A + 100 cc/t D | 17 | <1000 | A |
| T15 = 450 cc/t A + 150 cc/t D | 2 | <1000 | A |
| T16 = 450 cc/t A + 200 cc/t D | 17,000 | >1000 | C |

The table of comparisons of results of the three repetitions is shown in FIG. 1.

As conclusions of the experiment, it is concluded that: (a) The best treatment using peroxyacetic acid was T7 (450 cc/t dose), decreasing Fecal Coliform populations from 1,414,214 NMP/g 1,000 NMP/g and 4.5 NMP/g in repetition 2 and 3 respectively, with which they can be used in agriculture and manipulated by direct contact by people; (b) The best treatment using the chemical digester was T3 (dose of 150 cc/t), decreasing Fecal Coliform populations from 1,414,214 NMP/g to 1,000 NMP/g and 9.2 NMP/g in repetition 2 and 3 respectively and (c) The best treatment using the combination of chemical digester plus peroxyacetic acid was T15 (dose of 150 cc/t of stubble digester+450 cc/t of peroxyacetic acid), achieving to reduce Fecal Coliform populations from 1,414,214 NMP/g up to 2 NMP/g.

Example No. 2: Blocking Ammonia (NH3) in Poultry Plants in El Salvador

We worked on poultry factories with tunneling sheds of broiler chickens by spraying or applying the chemical digester to the soil directly. Applications of 0.4 cc/Mt2 were made, direct to the soil for 3 days, prior to the entry of chicks in their production cycles. It was observed that by blocking ammonia the fattening cycle of the chicks was reduced from 35 to 30 days, observing reduction of bad odors, reduction of number of flies by visual method, elimination of waste in 30 days producing an energy saving in the poultry fattening.

Reduction in ammonia (NH3) levels below 10 ppm in the soil was observed, thus reducing the potential for respiratory diseases.

Example No. 3: Decomposition of Dead Poultry Residues in El Salvador

It was applied by means of aspergeo and/or by direct application to the remains in layers over dead birds and poultry litter. A mixture of 40 cm3 of the chemical digester presented in this invention plus 200 cm3 of molasses was provided in 40 liters of water. Subsequently, dead birds covered with poultry litter were moistened. In less than 20 days the dead birds covered with chicken manure previously wetted with the mixture kept under observation and it was proved the absence of bad odors and absence of ammonia (NH3).

Although this invention has been described in detail with particular reference to the preferred embodiments, other embodiments can achieve almost the same results. Variations and modifications of this invention will be considered "obvious" to those skilled in the art and all modifications and equivalents of this type are intended to be covered in the appended claims.

It is noted that any embodiment mentioned in this specification may be implemented with respect to any method, kit, reagent or composition of the invention, and vice versa. In addition, the compositions of the invention can be used to achieve the methods of the invention.

It will be understood that the particular embodiments described herein are shown by way of illustration and not as limitations of the invention. The main features of this invention can be employed in various embodiments without departing from the scope of the invention. Those skilled in the art will recognize, or may determine using no more than routine experimentation, numerous equivalents to the specific procedures described in this document. Said equivalents are considered to be within the scope of this invention and are covered by the claims.

All publications and patent applications mentioned in the specification are indicative of the skill level of those skilled in the art to which this invention pertains.

The use of the word "a" when used in conjunction with the term "comprising" in the claims and/or in the specification may mean "one", but may also mean "one or more", "at least one" and "one or more than one". "The use of the term" or "in the claims is used to mean" and/or "unless explicitly stated otherwise. In this entire application, the term "approximately" it is used to indicate that a value that includes the inherent error variation for the method to be used to determine the value or variation existing between the studied objects.

As used in this specification and in the claims, the words "comprising" (and any form of understanding, such as "understand" and "comprise"), "have" (and any form of having), "inclusive" (and any form of inclusion, such as "includes" and "include") or "contain" (and any form of containing, such as "contains" and "contain") are inclusive and/or open meanings and does not exclude elements or steps of method not mentioned. In embodiments of any of the compositions and methods provided herein, "comprising" can be replaced by "consisting essentially of" or "consisting of".

As used herein, the phrase "consisting essentially of" requires the specified integer (s) or steps, as well as those that do not materially affect the character or function of the claimed invention. As used herein, the term "consistent" is used to indicate the presence of the recited integer (e.g., a characteristic, an element, a characteristic, a property, a method/process step or a limitation) or a group of integers for example, characteristic (s), element (s), characteristic (s), property (s), method and/or process steps or limitations (s) only.

The term "or combinations thereof" as used herein refers to all the permutations and combinations of the elements listed preceding the term. For example, "A, B, C, or combinations thereof" is intended to include at least one of: A, B, C, AB, AC, BC or ABC, and if the order is important in a particular context, also BA, CA, CB, CBA, BCA, ACB, BAC or CAB. Continuing with this example, combinations containing repetitions of one or more elements or terms, such as BB, AAA, AB, BBC, AAABCCCC, CBBAAA, CABABB, etc., are expressly included. The person skilled in the art will understand that there is usually no limit to the number of elements or terms in any combination, unless the context indicates otherwise.

As used herein, the words "approximate", "substantial" or "substantially" refer to a condition that when modified is understood not necessarily to be absolute or perfect, but would be considered as sufficiently close to the Stalled in the art to justify the designation of the condition as present. The extent to which the description may vary will depend on how large a change may be implemented and that one skilled in the art recognizes that the modified characteristic still has the characteristics and capabilities required of the unmodified characteristic. In general, but subject to the aforementioned, a numerical value here modified by an approach word such as "approximately" may vary from the set value by at least ±1, 2, 3, 4, 5, 6, 7, 10, 12 or 15%.

All compositions and/or methods described and claimed herein may be manufactured and executed without undue experimentation in light of the present disclosure. Although the compositions and methods of this invention have been described in terms of preferred embodiments, it will be apparent to those skilled in the art that variations can be applied to the compositions and/or methods and in the steps or sequence of steps of the method described. here without departing from the concept, spirit and scope of the invention. All of these substitutes and similar modifications apparent to those skilled in the art are considered within the spirit, scope and concept of the invention as defined in the following claims.

The invention claimed is:

1. A method for producing a chemical digester characterized in that it comprises:
    (a) Heat water in a first reactor until reaching a constant temperature of 38° C.;
    (b) Add under stirring by dispersing a thickener in the mixture;
    (c) Add to the mixture, a polysaccharide leaving stirring for a range of at least 25-30 minutes;
    (d) Add antifoam to the mixture, continuing the mixture stirring at medium speed for at least 10 minutes;
    (e) Add water by suspending the heat until complete dispersion of the mixture;
    (f) Add to the mixture a first organic acid previously mixed with water;
    (g) Add to the main reactor a second organic acid together with an inorganic acid keeping the dispersion until the mixture is homogenized.

2. A method for producing a chemical digester according to claim 1 characterized because the water added in the first reactor comprises 48% (m/m) of the reactor.

3. A method for producing a chemical digester according to claim 1 characterized because thickener added at 0.33% (m/m) is xanthan gum.

4. A method for producing a chemical digester according to claim 1 characterized because added polysaccharide in a range of 2%-3% (m/m) is sucrose.

5. A method for producing a chemical digester according to claim 1 characterized in that the antifoam added in a range of 0.22%-0.24% (m/m) is Wacker Polysiloxate.

6. A method for producing a chemical digester according to claim 3 characterized in that the aggregate of the thickener is made under agitation of 700 rpm.

7. A method for producing a chemical digester according to claim 5 characterized in that the aggregate of the antifoam is made under agitation between 350 rpm-550 rpm.

8. A method for producing a chemical digester according to claim 1 characterized because the second addition of water is made in 43.01% (m/m) stirring after its incorporation into the mixture for at least 10 minutes.

9. A method for producing a chemical digester according to claim 1 characterized because the first organic acid previously mixed in a second reactor with water in a ratio of 1:2 (citric acid and water respectively) is citric acid.

10. A method for producing a chemical digester according to claim 9, characterized because the mixture of organic acid and water represents 6.55% (m/m) of the mixture to which it is subsequently added.

11. A method for producing a chemical digester according to claim 10 characterized because the mixture of the organic acid with the water is kept in constant stirring for at least 10 minutes, being subsequently poured into the mixture of the first reactor at a constant speed of 15 liters/minute.

12. A method for producing a chemical digester according to claim 1 characterized because the second organic acid used at 0.84% (m/m) is acetic acid.

13. A method for producing a chemical digester according to claim 1, characterized because the inorganic acid used in 3.75% (m/m) is 85% pure phosphoric acid (P2O5).

14. A method for producing a chemical digester according to claim 13 characterized because the inorganic acid is added to the mixture under agitation while remaining under stirring for at least 10 minutes after the mixture is homogenized.

15. A method for producing a chemical digester according to claim 1 characterized because after achieving the homogeneous dissolution of all its elements the mixture remains in dispersion for a range of at least 25-30 minutes at room temperature.

16. A method for producing a chemical digester according to claim 1, characterized because it may include an additional step consisting of packaging the mixture in containers suitable for storing acids.

17. A method for producing a chemical digester characterized in that it comprises:
  (a) Add under stirring by dispersing a thickener in the mixture;
  (b) Add to the mixture a polysaccharide leaving stirring for a range of at least 45-50 minutes;
  (c) Add an antifoam to the mixture, continuing the mixture at medium stirring speed for at least 10 minutes;
  (d) Add water until complete dispersion of the mixture;
  (e) Add to the mixture a first organic acid previously mixed with water;
  (f) Add to the main reactor a second organic acid together with an inorganic acid maintaining the dispersion until the mixture is homogenized.

18. A method for producing a chemical digester according to claim 17 characterized because the water added in the first reactor comprises 48% (m/m) of the reactor.

19. A method for producing a chemical digester according to claim 17 characterized because the thickener added at 0.33% (m/m) is xanthan gum.

20. A method for producing a chemical digester according to claim 17 characterized because the added polysaccharide in a range of 2%-3% (m/m) is sucrose.

21. A method for producing a chemical digester according to claim 17 characterized because the antifoam added in a range of 0.22%-0.24% (m/m) is Wacker Polysiloxate.

22. A method for producing a chemical digester according to claim 19, characterized because the thickener is added under agitation at 700 rpm.

23. A method for producing a chemical digester according to claim 21 characterized because the aggregate of the antifoam is made under agitation between 350 rpm-550 rpm.

24. A method for producing a chemical digester according to claim 17 characterized because the second addition of water is made in 43.01% (m/m) stirring after its incorporation into the mixture for at least 10 minutes.

25. A method for producing a chemical digester according to claim 17, characterized because the first organic acid previously mixed in a second reactor with water in a ratio of 1:2 (citric acid and water respectively) is citric acid.

26. A method for producing a chemical digester according to claim 25, characterized because the mixture of organic acid and water represents 6.55% (m/m) of the mixture to which it is subsequently added.

27. A method for producing a chemical digester according to claim 26 characterized because the mixture of the organic acid with the water is kept in constant stirring for at least 10 minutes, being subsequently poured into the mixture of the first reactor at a constant speed of 15 liters/minute.

28. A method for producing a chemical digester according to claim 17 characterized because the second organic acid used at 0.84% (m/m) is acetic acid.

29. A method for producing a chemical digester according to claim 17, characterized because the inorganic acid used in 3.75% (m/m) is 85% pure phosphoric acid (P2O5).

30. A method for producing a chemical digester according to claim 29, characterized because the inorganic acid is added to the mixture under agitation while remaining under stirring for at least 10 minutes after the mixture is homogenized.

31. A method for producing a chemical digester according to claim 17 characterized because after achieving the homogeneous dissolution of all its elements the mixture remains in dispersion for at least 25-30 minutes at room temperature.

32. A method for producing a chemical digester according to claim 17, characterized because it may include an additional step consisting of packaging the mixture in containers suitable for storing acids.

33. A method for the treatment of organic substances characterized in that it comprises:
  (a) diluting the mixture applying the mixture obtained according to claim 15;
  (b) application to organic substance.

34. A method for the treatment of organic substances characterized because it comprises:
  (a) diluting the mixture applying the mixture obtained according to claim 31;
  (b) application to organic substance.

* * * * *